Patented Dec. 1, 1931

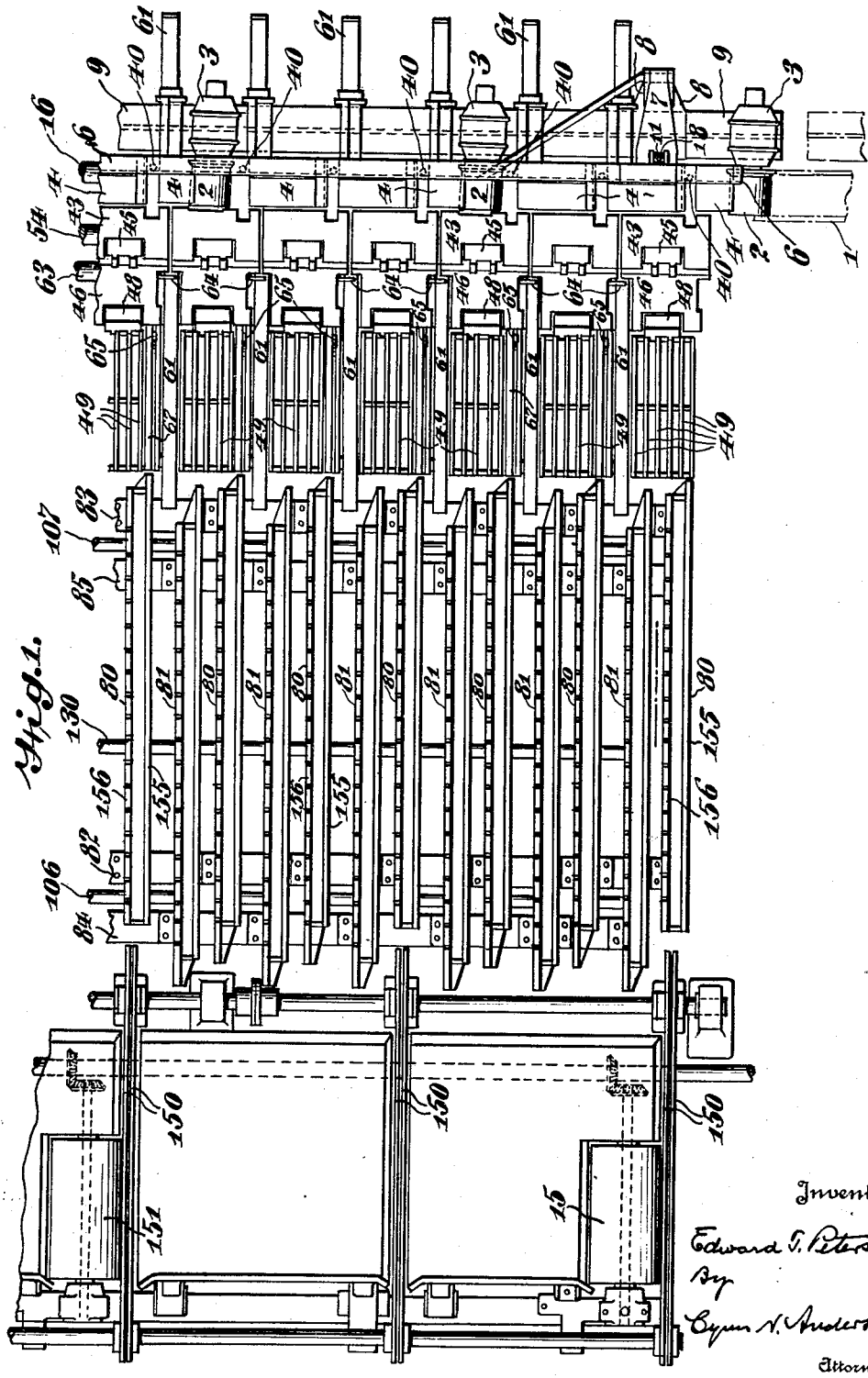

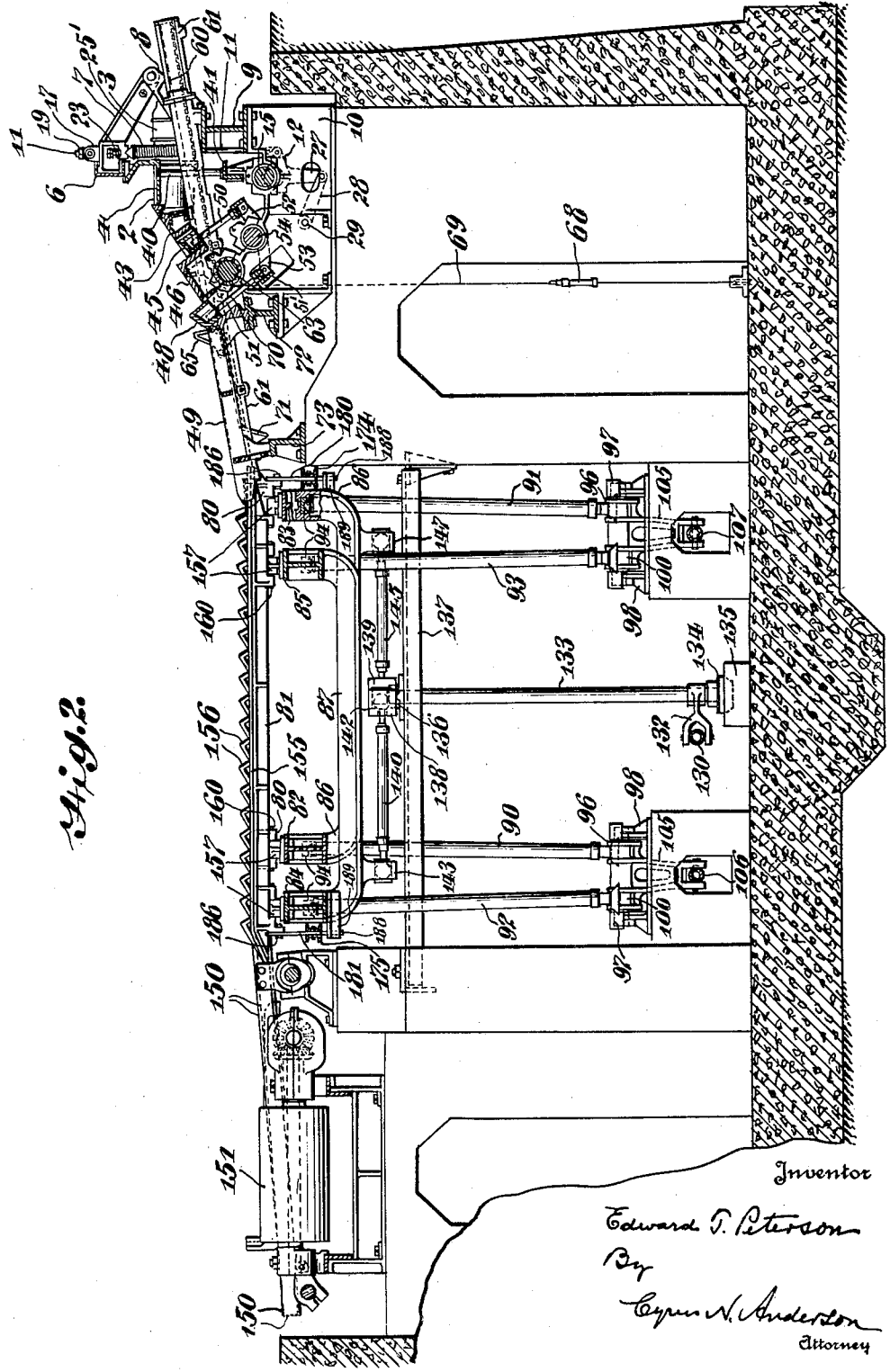

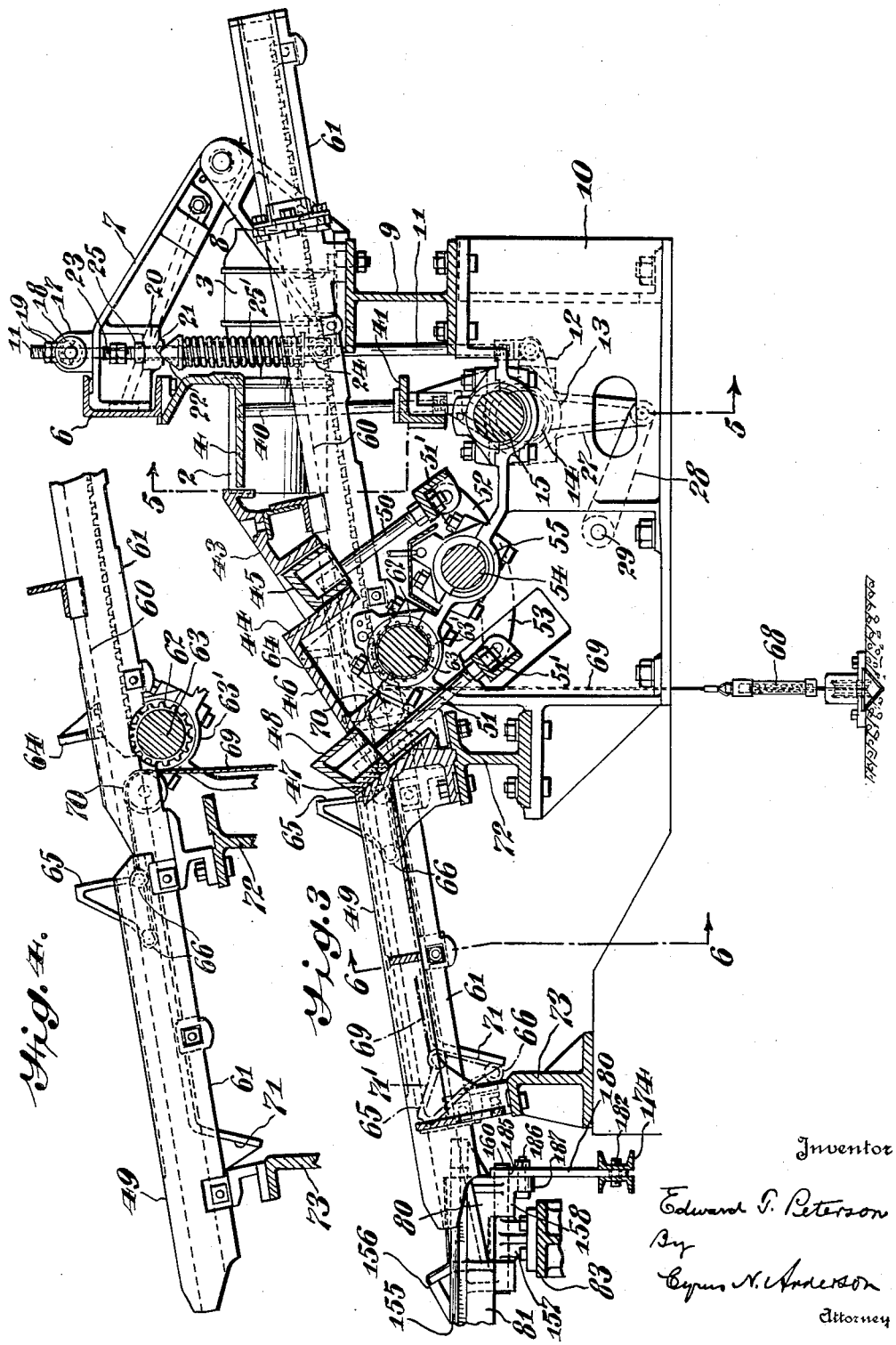

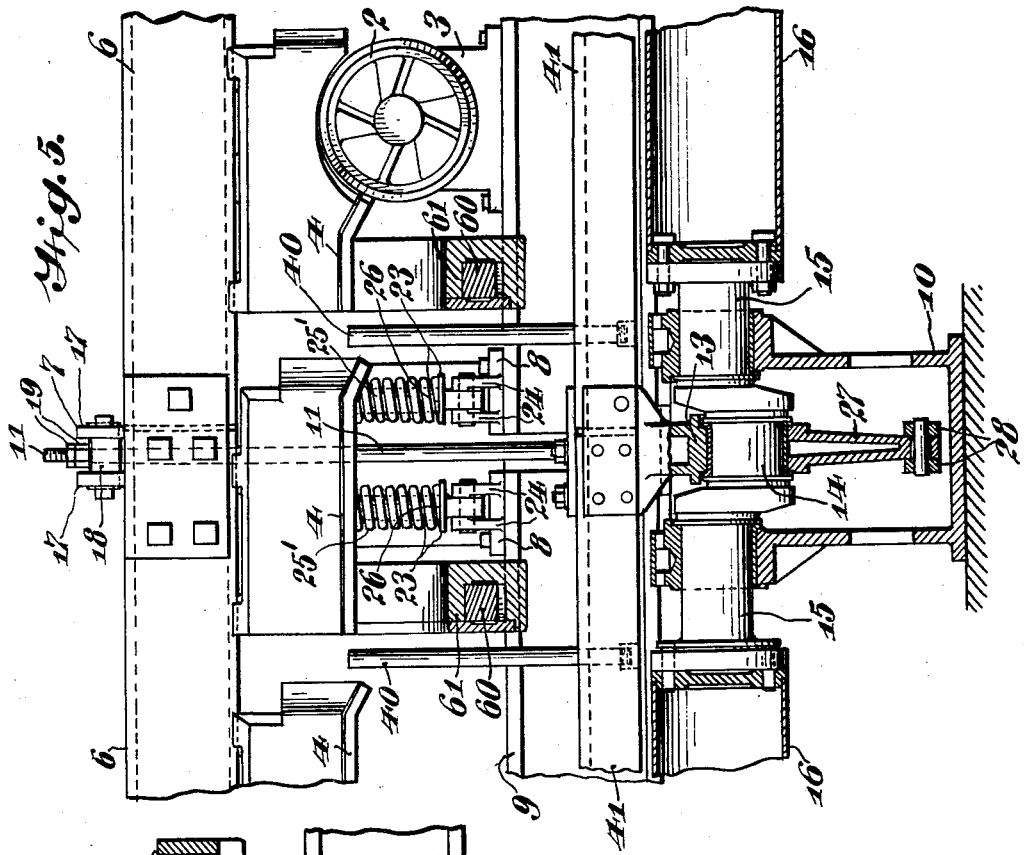

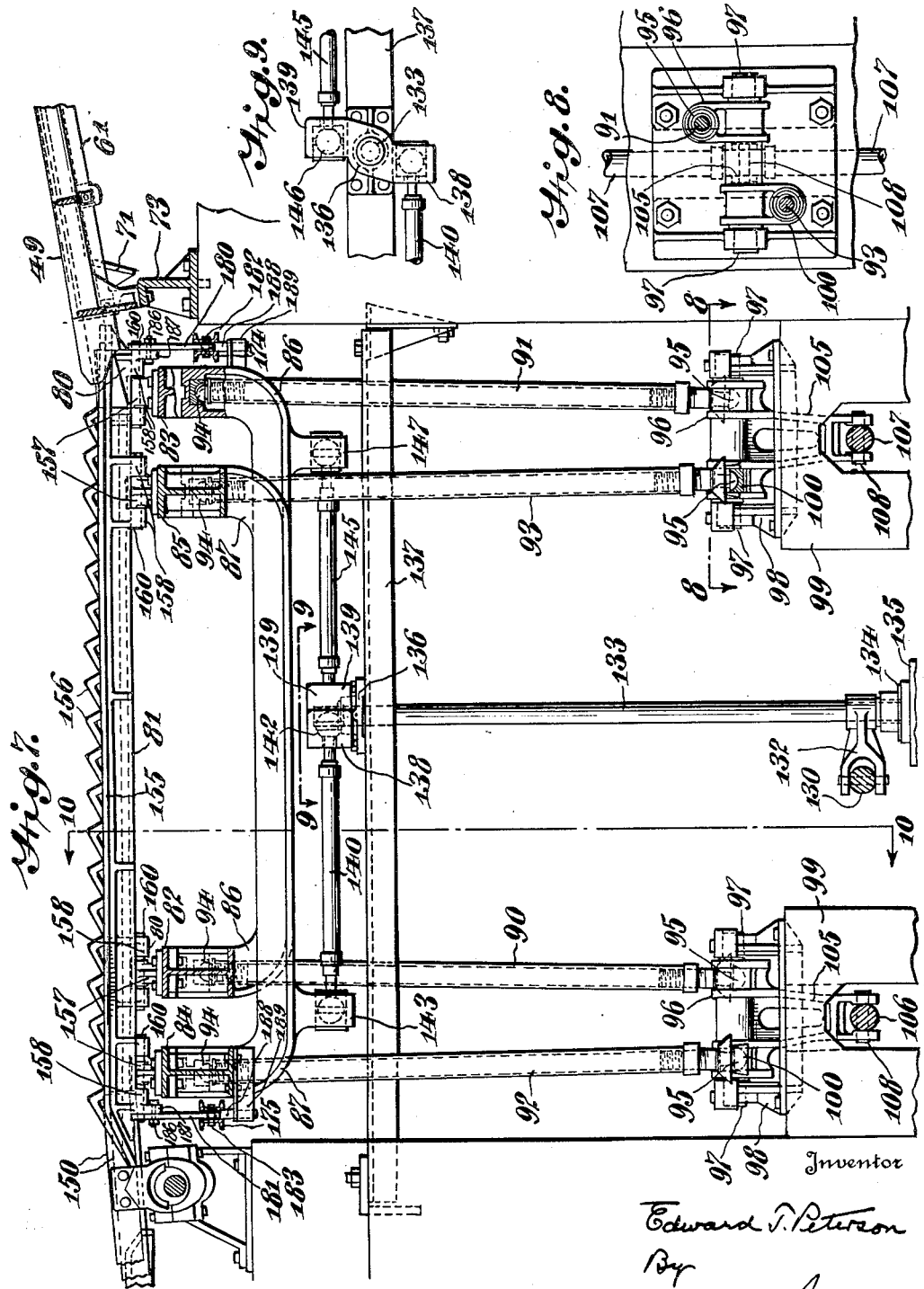

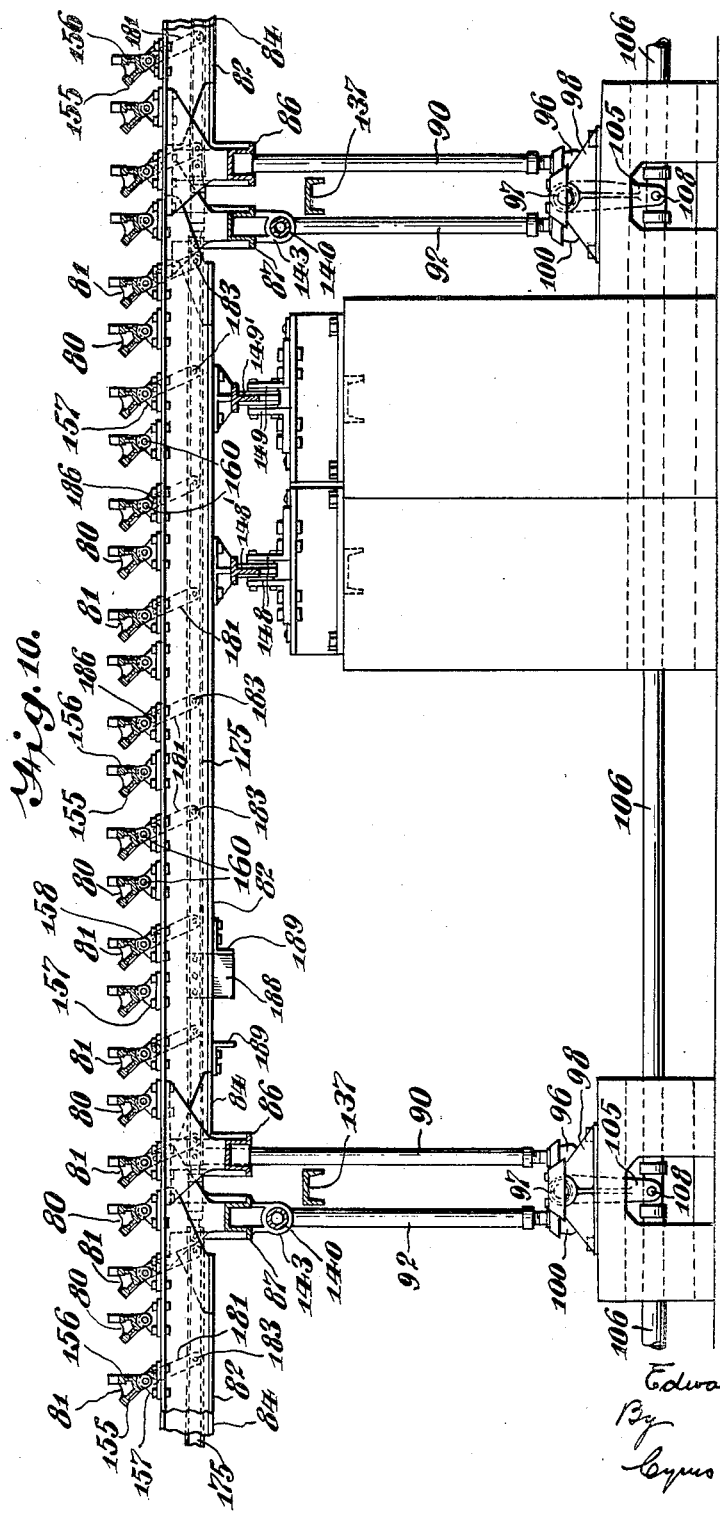

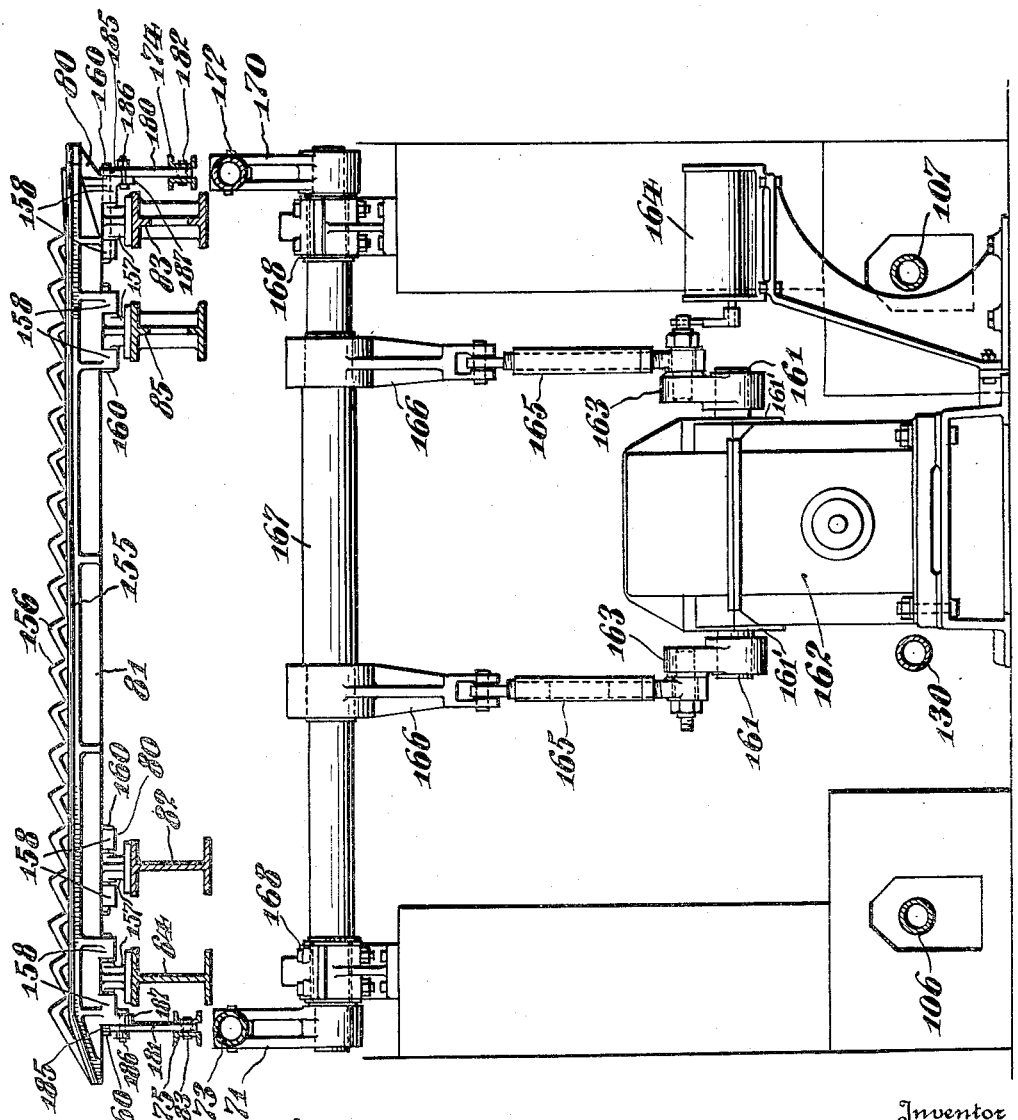

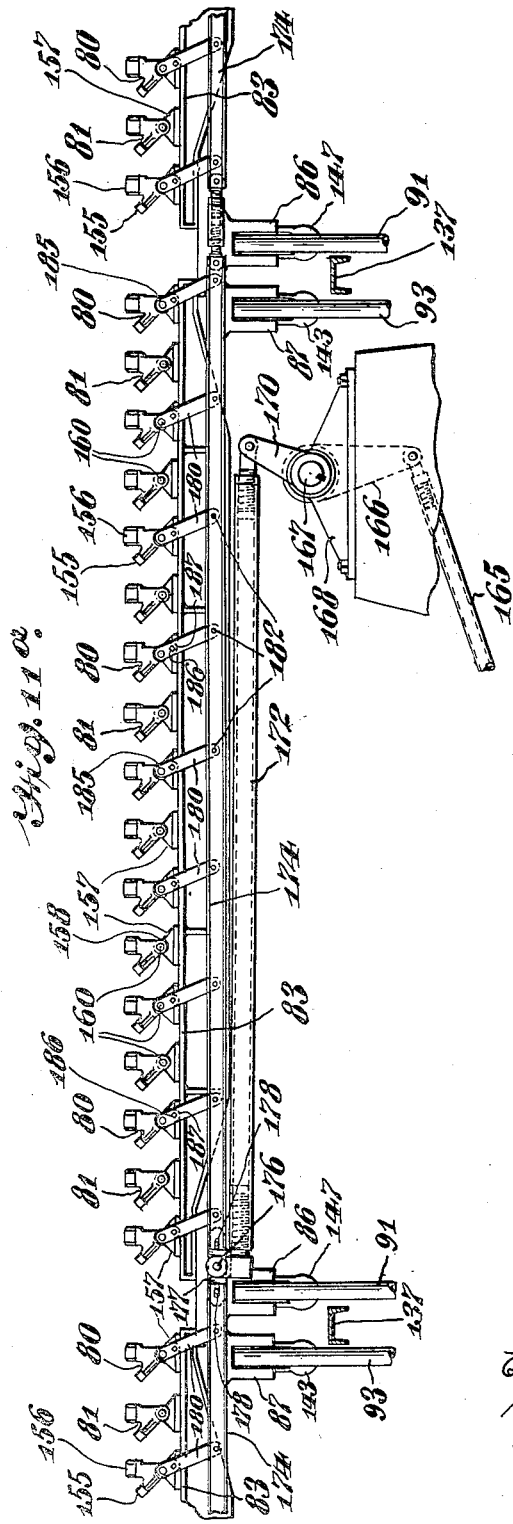

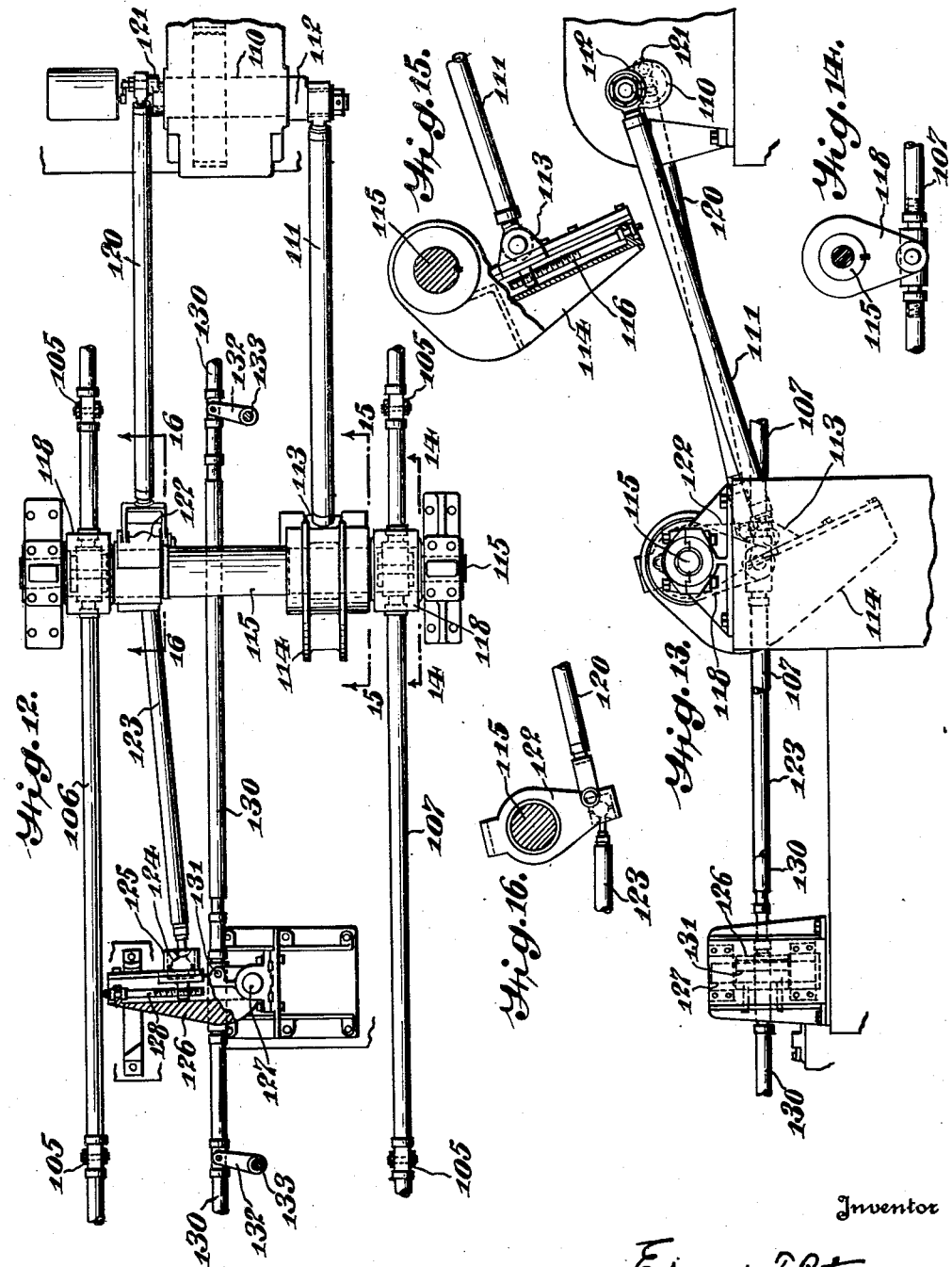

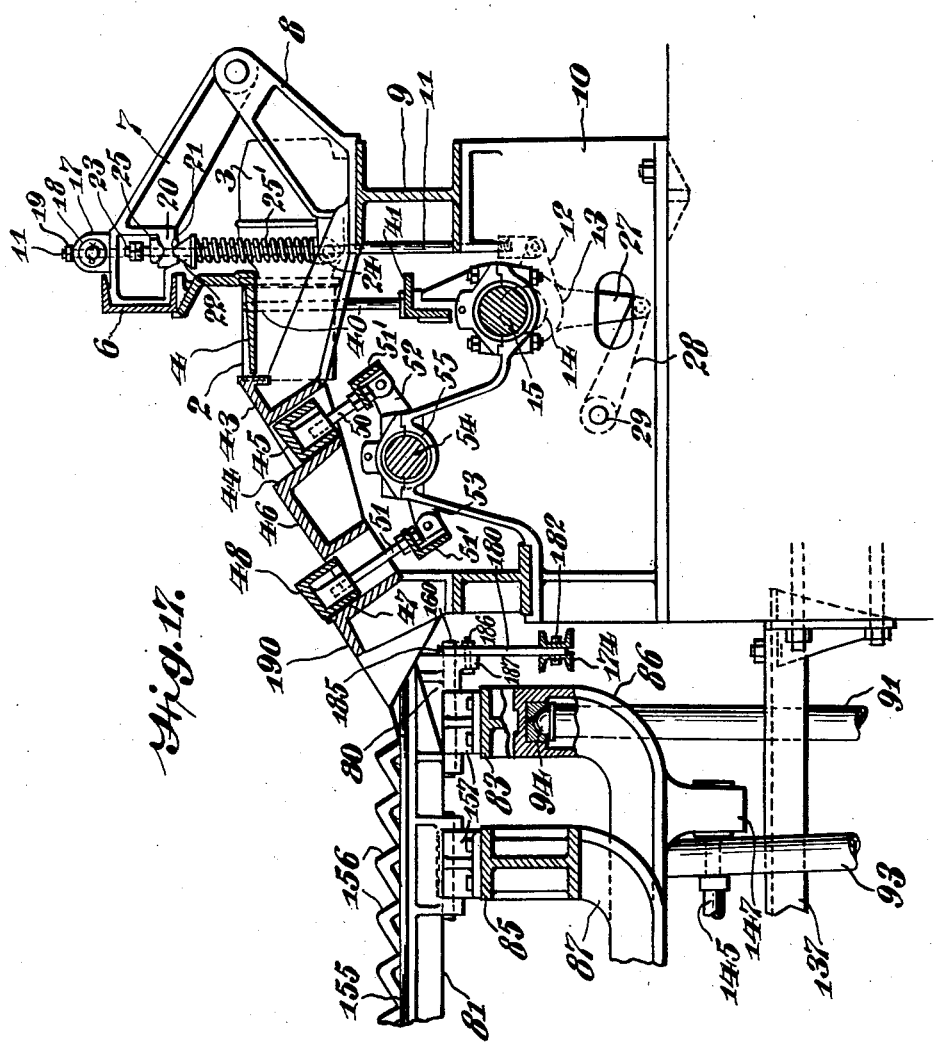

1,834,728

UNITED STATES PATENT OFFICE

EDWARD T. PETERSON, OF READING, PENNSYLVANIA, ASSIGNOR TO BIRDSBORO STEEL FOUNDRY AND MACHINE COMPANY, OF BIRDSBORO, PENNSYLVANIA, A CORPORATION OF PENNSYLVANIA

HOTBED

REISSUED

Application filed August 29, 1929. Serial No. 389,119.

My invention relates to apparatus for use in rolling mills and the like for cooling bars, rounds, and other like metal products, such apparatus being generally known in the art as hot beds.

The general object of the invention is to provide an apparatus having means whereby the work to be cooled may be caused or permitted to travel at relatively low speed or rapidly across the hot bed structure.

It also is an object of the invention to provide a hot bed having novel means for delivering the work to be cooled onto the transversely extending bars of the hot bed structure.

A further object is to provide means of novel construction whereby the work to be cooled, consisting of bars or the like, may be transferred by a continuous movement from a delivery table to the hot bed bars or by an intermittent movement.

A still further object of the invention is to provide means whereby either notched or smooth topped or edged hot bed bars may be presented for supporting the work to be cooled as it is moved across the hot bed structure.

A still further object of the invention is to provide an improved and novel construction of means for operating the hot bed bars and for varying the movements thereof for effecting conveyance of the work across the structure.

I shall not attempt here to set forth the many other objects which are characteristic of the invention but additional objects either will be specifically pointed out in the detailed description which follows or will be apparent from such description.

In order that the invention may be readily understood and its many practical advantages clearly appreciated reference should be had to the accompanying drawings wherein I have illustrated an apparatus embodying the invention in the form which at present is preferred by me. However, it will be understood that the invention is susceptible of embodiment in other forms of construction than that shown and that changes in the details of construction may be made within the scope of the claims without departing from the invention or the principle thereof.

In the drawings:

Fig. 1 is a view in top plan of a fragmentary part of the hot bed structure including the front end portion thereof;

Fig. 2 is a typical transverse sectional view of the structure;

Fig. 3 is a typical transverse sectional view of the portion of the apparatus by which the work to be treated is transferred from the delivery table onto the hot bed bars;

Fig. 4 is a transverse sectional view similar to that of Fig. 3 but showing certain parts of the structure in greater detail;

Fig. 5 is a longitudinal sectional view of a fragmentary portion of the structure taken on the line 5—5 of Fig. 3;

Fig. 6 is a similar view taken on the line 6—6 of Fig. 3;

Fig. 7 is a transverse sectional view showing an enlargement of a portion of the structure which is illustrated in Fig. 2;

Fig. 8 is a horizontal sectional view taken on the line 8—8 of Fig. 7;

Fig. 9 is a horizontal plan view taken in the plane 9—9 of Fig. 7;

Fig. 10 is a longitudinal sectional view taken on the line 10—10 of Fig. 7 indicating a portion of the means by which the positions of the hot bed bars may be regulated and controlled and by which they may be actuated;

Fig. 11 is a transverse sectional view showing the means by which the controlling means for the hot bed bars may be actuated;

Fig. 11ª is a view in side elevation of a fragmentary portion of the structure looking from the right toward the left in Fig. 11;

Fig. 12 is a view partly in top plan and partly in horizontal section showing a portion of the means by which certain movements of the hot bed bars are effected;

Fig. 13 is a view in side elevation of the mechanism or means shown in Fig. 12;

Fig. 14 is a transverse sectional view taken on the line 14—14 of Fig. 12;

Fig. 15 is a similar view taken on the line 15—15 of Fig. 12;

Fig. 16 is a similar view taken on the line 16—16 of Fig. 12; and

Fig. 17 is a transverse sectional view similar to that shown in Fig. 3 showing a modified construction of means for transferring the work to be treated from the delivery table to the hot bed bars.

In the operation of the apparatus the work to be treated, which may be in the form of bars, rounds and the like, is conveyed from the mill to what is known as the approach table of the hot bed apparatus, from which it is transferred onto the bars which extend crosswise of the hot bed structure and by which the work to be cooled is conveyed transversely of the structure from one side to the other thereof. From the said bars the work, whatever it may be, is transferred to conveying means by which it is conducted away from the hot bed structure.

In the construction of apparatus as illustrated I have shown in the first figures of the drawings a construction by the use of which the work to be treated may be transferred directly from the approach table onto the hot bed bars or else the transfer may be made by an intermittent or step-by-step movement. In the latter event the operation which may be described as "pack annealing" may be effected. However, in the form of construction as illustrated in Fig. 17 of the drawings I have made no provision for the latter operation but have provided means whereby the work may be transferred from the approach table to the hot bed bars.

I shall now proceed with a detailed description of my invention and in doing so shall refer to the drawings employing like characters of reference for corresponding parts of the mechanism which may appear in the several figures thereof.

In the drawings I have indicated diagrammatically at 1 by dash and dot lines (Fig. 1) a fragmentary portion of the discharge end of the means by which the work is conveyed from the mill to the rotating rollers or drums 2 which constitute a part of the approach means of the apparatus. These rollers or drums are separately driven by means of electric motors 3. Plates 4 (Figs. 1 and 2) constituting what may be defined as the approach table of the apparatus are located between the rotating rollers or drums 2 (Figs. 1, 2, 3, 5 and 17). These plates are supported upon the lower edges of sills 6 which are supported upon the inner ends of inwardly and upwardly extending arms 7 which are pivotally supported at their outer ends upon brackets 8 which in turn are supported upon stationary sills 9, the adjoining ends of which are slightly separated as shown in Fig. 5. These sills are mounted upon stationary base members 10. The arms 7 are normally supported in the position in which the arm shown in Fig. 3 is supported.

The means for supporting and actuating the arms 7 to raise and lower the plates 4 comprises rods 11 located at intervals which are connected at their lower ends to arms 12 which extend laterally from straps 13 mounted upon the eccentric or crank portions 14 of a crank shaft comprising the solid and tubular portions 15 and 16 connected together in end-to-end relation as indicated in Fig. 5 of the drawings. The upper ends of the rods 11 extend upwardly through the arms 7 between lugs or ears 17 which project upwardly therefrom and through members 18 pivotally supported upon the said lugs. The upper ends of the rods 11 are retained in connection with the members 18 by means of nuts 19. The rods 11 are in slidable engagement with the members 18.

The arms 7 are provided with shoulders or brackets 20 (only one of which is shown) (Figs. 3 and 17) upon their underneath sides near their upper ends. The lower sides of these shoulders are provided respectively with depressions 21 constituting seats with which the upper ends of bearing blocks 22 are in engagement. These bearing blocks are slidably mounted upon rods 23 which are pivoted at their lower ends to lugs 24 (Figs. 3 and 5) provided upon the upper edges of the stationary sills 9, as shown in Fig. 5 of the drawings. These rods 23 extend upwardly through openings in the brackets or shoulders 20. The upper sides of the brackets or shoulders 20 are provided with slight depressions in opposed relation to the depressions constituting seats 21 and are engaged by retaining nuts 25 which are adjustably connected with the rods 23.

The bearing blocks 22 are held upwardly in engagement with the seats 21 by means of springs 25' which are coiled around the rods 23. The lower ends of the said springs are seated upon shoulders 26 provided upon the rods 23 at their lower ends. The upper ends of the said springs bear against the under sides of the blocks 22 and hold them firmly against the seats 21 in the lower sides of the shoulders or brackets 20.

The straps 13 are provided with downwardly extending arms 27 to the lower ends of which are connected the outer swinging ends of links 28 pivoted at their opposite ends to stationary pivots as indicated at 29.

It will be understood that when the plates 4 and the levers 7 are in the positions indicated in Fig. 3 of the drawings the springs 25' will be compressed and that they exert a constant pressure against the levers 7 to elevate them together with the parts carried thereby so as to elevate the plates 4 to positions such that their upper surfaces will be located in a plane above a plane tangent to the tops of the rollers or drums 2 so as to stop the feeding movement of the work by the said rollers or drums and so also as to permit transference of the work from the approach table in the manner and by the means to be hereinafter described.

It will be understood that upon rotative movement of the shaft comprising the parts 16 and 15 the straps 13 will be moved corresponding to the movements of the eccentrics or cranks 14. Such movements, owing to the connection of the arms 27 with the outer swinging ends of the links 28 will include a pivotal motion so as to cause upward and downward movement of the outer ends of the arms 12 to effect a corresponding movement of the rods 11.

Upon upward movement of the said rods they will slide or tend to slide or move upwardly with respect to the levers 7, but owing to the pressure of the springs 25' against the said levers through the bearing blocks 22 the said levers likewise will move upwardly and the plates 4 thereby transferred into positions with their upper surfaces occupying a plane above a plane tangential to the tops of the rollers or drums 2 as previously stated. During the pivotal movement of the straps 13 the arms 12 thereof move downwardly and cause a like downward movement of the rods 11, which operates to pull the levers 7 downwardly in opposition to the upward pressure of the springs 25'.

It will be seen that by the foregoing construction the levers 7 and the plates 4 supported thereby are yieldingly held whereby the mechanism involved in operation are not subjected to destructive shocks and vibrations.

Any suitable means may be employed for operating the shaft comprising the parts 15 and 16 (Figs. 1 and 5). It will be understood that the operation of the parts must be so related and timed that the rods 11 will be raised to permit elevation of the arms 7 and the plates 4 carried thereby at the proper time with respect to the position of a bar, round or other work upon the rollers or drums 2. In other words, the plates 4 are lifted or elevated after the work has arrived at a proper position thereover. That is a common requirement of apparatus of this class.

For the purpose of removing the bars, rounds or other work from the plates 4 I have provided kick-off arms 40 which are mounted upon a longitudinally extending sill 41 supported upon arms which project upwardly from the straps 13 mounted upon the eccentrics or cranks 14. The manner in which the pivotal movement of the straps 13 is effected has been pointed out already. Obviously such pivotal movement will cause oscillatory or swinging movements of the sill 41 upon which the kick-off bars 40 are mounted so that the said bars will be caused to swing back and forth crosswise of the plates 4.

The rotary movement of the cranks or eccentrics 14 also will cause up and down movements of the kick-off arms 40 so as to carry the upper ends thereof at the proper time with respect to the operation of the apparatus into position to engage any bar, round or other work which may be supported upon the plates 4 when they have been lifted, as previously described, to transfer the same from the plates onto the downwardly inclined adjoining step 43 which terminates against a shoulder 44.

For the purpose of lifting the work, whether of bar, round or other shape, I have provided reciprocatable plungers 45 the inner sides of which move in parallel relation to and in contact with the shoulder 44 (Fig. 3). It will be noted that the upper surfaces of the plungers 45 are inclined downwardly at a slightly greater angle than the surface of the step 43 so that when the said plungers are moved upwardly so as to carry the work to a position above the upper edge of the shoulder 44 it will slide therefrom onto the second step 46 which terminates against a shoulder 47. Plungers 48, similar to the plungers 45, are provided for lifting or elevating the work from the lower end of the step 46 so as to cause it to slide onto the upper edges of the series of parallel spaced bars 49 along which the work may be caused to move continuously or along which it may be caused to move intermittently or step-by-step, as hereinafter will be described.

For the purpose of operating the plungers 45 and 48 I have supported them by means of connecting rods 50 and 51 upon angle irons 51' which in turn are supported upon the outer ends of arms 52 and 53 mounted upon a rocker shaft 54 supported in stationary bearings 55. It will be quite apparent that upon rocking the shaft 54 the plungers 45 and 48 are moved simultaneously in opposite directions so that when the plungers 45 occupy a "down" position as shown in Fig. 3 the plungers 48 occupy their "up" position. Any suitable means may be employed for effecting or causing rocking movement of the rock shaft 54.

For the purpose of causing movement of the work (other than rounds) downwardly upon the inclined bars 49 I have provided push bars 60 slidably mounted in stationary push bar guides 61. The lower edges of these bars are provided with teeth, as indicated, which engage the gear teeth 62 upon a rotatable shaft 63 supported in suitable stationary bearings 63'. Means of any known construction or character may be employed for effecting rotation of the shaft 63 through greater or less distances, depending upon the amount of rectilinear movement it is desired to impart to the push bars 60. The push bars are each provided with upwardly projecting brackets 64 located in adjoining relation to their inner ends which are adapted to contact with a bar or other like member which has been lifted by the plungers 48.

While the bars are still held by the plungers 48 in elevated position the reciprocatory push bars 60 move inwardly and cause the projections 64 thereon to contact with the said bars or other like work and move them positively onto the upper edges of the bars 49 and against the retarding blocks 65 slidably supported at intervals and in intermediate relation to groups or bars 49. The base portions of the retarding blocks 65 are mounted in guide-ways 66 provided by means of a bar 67 properly shaped in cross section and supported upon one side of the guides for the push bars 60. I have provided counter-weights 68 for the retarding devices 65, the said counter-weights being connected to the said retarding devices by means of flexible connections 69 which travel over grooved rollers 70, as shown in Figs. 3 and 4.

If it is desired to pile or pack the bars or other similar work which is being handled upon the inclined bars 49 the retarding devices 65 are retained in place and the shaft 63 is operated so as to terminate the inward movements of the push bars 60 when the projections 64 thereon have reached positions sufficient to transfer or remove the work onto the upper end portions of the upper edges of the said bars 49. If the work is in the form of bars of rectangular shape in cross section the bars will stand on their edges with their sides in contact, being held in such position by the engagement of the retarding devices 65 with the lowermost or innermost of the said bars.

When the inward movements of the push bars terminate as stated it will be apparent that at each inward movement thereof the bars upon the inclined supporting bars 49 will be moved forwardly or inwardly a distance equal to the thickness of a bar. When finally the retarding devices have reached the limit of their inward movement they travel downwardly upon the downwardly inclined guide sections 71 and when located thereon occupy the positions as indicated by the dash lines 71' in Fig. 3. When in such position it will be clear that the said retarding devices occupy positions below the upper edges of the inclined bars 49.

The lowermost of the bars of the pack or pile will fall downwardly onto its side and as the operation proceeds the said bars will fall or drop one by one from the inner lower ends of the bars 49 onto the bars of the hot bed which hereinafter will be referred to and described in detail. Instead of rotating the shaft 63 through distances merely sufficient to cause inward movement of the push bars to the points indicated the said shaft may be operated so as to cause movements of the said push bars inwardly to push each of the bars or other work which is being treated individually or separately all the way along the inclined bars 49 so that they are immediately deposited onto the bars of the hot bed. In case of the latter operation it will be understood that the retarding blocks or members 65 are located in the position indicated by the dash lines in Fig. 3. By piling or packing the bars or other like work upon the inclined transfer bars 49 as above described I am enabled to control the cooling thereof, which is desirable if bars or other work having certain known characteristics are desired.

Thus far I have described that part of the apparatus embodying my invention by which the work being handled is conveyed to and deposited upon the hot bed bars of the structure and it will be seen that the mechanism employed not only is of simple character but that it operates in a manner to render it highly efficient and desirable.

An important characteristics of the mechanism as thus far described is its capacity for effecting either quick transfer of the work from the approach table to the hot bed bars or a relatively slow transfer thereof by an intermittent movement, the work in the latter case being moved forward in packed formation.

It may be noted that the bars 49 are supported at their opposite ends upon longitudinally extending spaced sills 72 and 73.

The work having been transferred onto the hot bed bars as heretofore described the latter are operated to effect transfer thereof crosswise of the apparatus and to discharge the same onto what may be referred to broadly as a discharge table by which it is conveyed away from the hot bed apparatus or structure.

The hot bed bars consist of two series, those in one series being designated 80 and those in the other series 81. The bars 80 are supported at their opposite ends upon longitudinally extending sills 82 and 83 while the bars 81 of the other series are supported upon the longitudinally extending sills 84 and 85. The sills 82 and 83 move in unison, that is to say, simultaneously and in like directions, being connected together at intervals by means of tie-bars 86. The same is true of the sills 84 and 85, the latter being connected together at intervals by means of crosswise extending connecting or tie-bars 87.

It may be noted that the hot bed may be of relatively great length, and it will be obvious that it would not be practical to employ single sills of such length because of the difficulties which would arise due to contraction and expansion with variations of temperature, consequently the longitudinally extending sills, such as 82 to 85 inclusive, are divided into sections which may be of any suitable length.

In order that the hot bed bars 80 and 81 shall operate to transfer or convey the work across the apparatus it is necessary that they be given a movement either through a circular or an oval path, as is common in the operation of hot beds. In the apparatus as illustrated the movement of the bars of the respective series toward the left should take place when in their upper positions in order that while in contact with the work they will convey the same toward the left, having reference to Fig. 2 of the drawings.

For the purpose of effecting movements of the hot bed bars in the manner stated the sills 82 and 83 are supported upon upright posts or bars 90 and 91 (Figs. 2, 7, 11ª and 17) which are located at intervals lengthwise of the structure, while the sills 84 and 85 are supported upon similar upright posts or bars 92 and 93 likewise located at intervals lengthwise of the structure. The upper ends of the respective posts or bars are connected by means of jointed connections 94 to the said sills, while the lower ends thereof are connected by jointed connections to the outer ends of pivotally supported arms.

The upright posts or bars 90 and 91 are connected by jointed connections 95 (Figs. 7, 8, and 10) to the outer ends of arms 96 all of which extend in the same direction from rock shafts 97 which are supported at proper intervals in bearings 98 supported upon suitable supports or columns 99. The upright posts or bars 92 and 93 are supported upon the outer ends of arms 100, similar to the arms 96, all of which extend in the same direction, which direction is opposite to that in which the arms 96 extend. The arms 100 project from the shafts 97 and the relation of each arm 100 to an arm 96 which projects from the same shaft is shown in Fig. 8 of the drawings.

From an inspection of Fig. 8 of the drawings it will be apparent that when the arms 96 move downwardly or are depressed the arms 100 will be moved upwardly or elevated so as to effect simultaneous movement of the upright posts or bars 90 and 91 and the sills supported thereby, and of the posts 92 and 93 and the sills supported thereby, in opposite directions.

For the purpose of effecting simultaneous rocking movements of all of the rock shafts 97 I have provided each of them with a depending arm 105, the arms at the opposite sides of the hot bed structure forming rows extending longitudinally of and throughout the length of the apparatus. The arms of the respective rows are connected by means of actuating rods 106 and 107 so that all of the arms may be actuated simultaneously. The arms are pivotally connected to the actuating rods by means of pivot pins or bolts 108.

For the purpose of reciprocating the connecting rods 106 and 107 for rocking the shafts 97 I have provided a crank shaft 110 (Figs. 12, 13 and 15) which may be rotated in any suitable manner. One end of a rod or link 111 is connected to the crank 112 at one end of the crank shaft 110, the opposite end of which is pivotally connected to a block 113 which is adjustably mounted upon a downwardly extending arm 114 which is rigidly connected with a rock shaft 115. Adjustment of the block 113 upon the arm 114 is effected in known manner by means of an adjusting screw or bolt 116. By varying the position of the block 113 upon the arm 114 the arc or portion of a circle through which the shaft 115 is rocked or moved may be varied. The greater the arc through which the shaft 115 is rocked the greater will be the distances through which the connecting rods 106 and 107 will be reciprocated. It will be noted that the rods 106 and 107 are connected to the lower ends of arms 118 which are rigidly connected with and project downwardly from the rock shaft 115. It will be obvious that by varying the distances through which the connecting rods 106 and 107 are moved the vertical distances through which the sills 82 to 85 inclusive travel in their up and down movements will be varied as such movements depend upon the extent of the rocking movements of the shafts 97 previously referred to.

For the purpose of effecting horizontal movement of the bars 80 and 81 I have provided a connecting rod 120 (Figs. 12, 13 and 16) one end of which is connected to a crank 121 which extends radially of the axis of the shaft 110 in a direction at right angles to that of the crank 112. The opposite end of the connecting rod 120 is pivotally connected to an arm 122 which is mounted to rock upon the shaft 115, as will be apparent upon reference to Fig. 16 of the drawings. A connecting rod 123 also is connected at one end by a universal joint connection to the lower end portion of the arm 122 and at its opposite end by a universal joint connection 124 to a block 125 which is mounted upon a horizontal arm 126 which is pivoted at one end upon a stationary pivot 127.

In and out adjustment of the block 125 is effected by an adjusting bolt or screw 128 which is mounted upon the said arm, as is clearly shown in Fig. 12 of the drawings. A connecting rod 130, which extends longitudinally or lengthwise of the apparatus and substantially throughout the length thereof, is pivotally connected at 131 to the arm 126. It will be apparent that rotation of the crank shaft 110 will effect reciprocatory movements of the connecting rods 120 and 123, which movements acting upon the arm 126 will cause an oscillating movement thereof about the pivot 127. Such oscillating movement imparts to the connecting rod 130 a reciprocating movement. The said rod is connected at intervals to horizontally extending arms 132 which project laterally from upright posts or columns 133 which are pivotally supported at their lower ends in sockets as indicated at 134 (Figs. 1 and 7) provided upon pedestals or bases 135.

The upper ends of the said posts or columns 133 are rotatably or rockingly supported in bearings at 136 provided upon stationary cross bars 137. The upper ends of the posts or columns 133 are provided with bars which are rigidly connected thereto at points intermediate their ends so as to provide oppositely extending arms 138 and 139. To the arms 138 connecting rods or links 140 are connected by universal joint connections as indicated at 142. At their opposite ends the connecting rods or links 140 are connected by universal joint connections, as indicated at 143, to lugs or projections which extend downwardly from the cross bars 87, to which reference has been made previously. Like connecting rods or links 145 are connected by universal joint connections, as indicated at 146, to the arms 139. At their opposite ends the said connecting rods or links are connected by universal joint connections, as indicated at 147, to lugs or projections which are provided upon the connecting bars 86.

It will be recalled that the connecting bars 86 and 87 respectively connect together the sills 82 and 83 and 84 and 85, and also that these respective pairs of sills each support a series of hot bed bars.

It will be apparent that upon the rocking of the posts or columns 133 the arms 138 and 139 are rocked therewith and that such rocking movement effects reciprocating movements of the connecting rods or links 140 and 145 simultaneously in opposite directions so that the two series of hot bed bars are simultaneously moved horizontally in opposite directions. It having been already set forth that these bars are simultaneously moved in vertical directions it will be apparent that they trace paths which may be circular or oval, which will depend upon the extent of the movements imparted thereto by the means previously described for effecting the respective vertical and horizontal movements thereof.

The movement of the respective series or groups of hot bed bars with relation to each other as described is known in the art and the adjustment of the mechanism for operating the said bars to effect these movements will be well understood by those skilled in the art to which the invention pertains.

To retain the sills 82 to 85 inclusive, their supports, and the parts supported thereby in proper position and at the same time permit vertical and lateral movements of said sills, I have provided at proper intervals stationary spaced guide lugs 148 and 149 (Fig. 10) with which the lower edge portions of bars 148' and 149' of T-shape in cross section are in slidable engagement. It is assumed that the bars 148' are supported at their opposite ends upon the sills 82 and 83 and that the bars 149' are supported at their opposite ends upon the sills 84 and 85.

The work finally is discharged from the hot bed bars onto the shuffle bars 150 of the discharge part of the structure and by the latter are transferred onto the rotating rolls 151 by which it is conveyed away to a predetermined position.

The discharge mechanism may be of any usual known construction and will not be referred to or described in further detail.

It is desirable in hot bed structures that means be provided whereby the work may be conveyed rapidly across the same or more slowly, and to that end I have conceived it to be desirable to provide a hot bed structure with means whereby hot bed bars having either smooth or notched top edges may be provided. This desirable feature of construction may be provided in various ways and by different means, but obviously the simpler the means for effecting the desired ends the better. In the present construction, which is that which I now prefer, I employ hot bed bars each of which in cross section is of forked shape, as best indicated in Fig. 10 of the drawings. Upon reference to that figure of the drawings it will be noted that the hot bed bars are substantially of V-shape in cross section whereby each bar provides two portions 155 and 156 either of which may be placed in vertical position to receive and support the work as it travels across the machine. In effect these two portions 155 and 156 (Figs. 1, 2, 3, 7, 10, 11, 11ª, and 17) constitute two separate bars because when adjusted so that the branches 156 are in use the branches 155 are in inactive or inoperative position, and vice versa. In Fig. 10 the notched branches of the bars occupy vertical positions so that the work is moved step-by-step or from notch to notch in the operation of the apparatus. When one of the branches of the respective bars occupies a vertical position the other branch thereof will occupy a position in angular relation to a vertical plane or line, and when in such position will not contact with the work. That will be apparent from an inspection of Fig. 10 of the drawings.

In order that the bars may be adjusted into the desired angular position to bring either the branches 155 or the branches 156 thereof into vertical position for use they are pivoted at their opposite ends upon pedestals 157 which are mounted upon the respective sills 82 to 85. The bars are provided in adjoining relation to their opposite ends with spaced lugs 158 which fit upon opposite sides of the pedestals 157. The said pedestals and the said lugs are provided with openings which extend therethrough through which pivot pins 160 extend to pivotally connect the said bars to the said pedestals.

For the purpose of effecting desired pivotal movements in the same direction simultaneously of all of the said bars so as to present the desired branches thereof into position to receive the work I have provided a rock shaft 161 (Fig. 11) supported in bearings 161'. Electrically actuated means for rocking said shaft is indicated at 162. The said rock shaft is provided with crank arms 163 which extend in the same direction radially therefrom. The said rock shaft is adapted to be rocked in either direction through proper distances, such distances being controlled by a limit switch for that purpose which is shown at 164.

The cranks 163 are connected by means of connecting rods 165 to the outer ends of arms 166 which are rigidly connected to a rock shaft 167 supported at its opposite ends in stationary bearings 168. Rocking movements of the cranks 163 operate through the connecting rods 165 and arms 166 (Figs. 11 and 11ª) to rock the shaft 167 to impart rocking movement to the upwardly extending arms 170 and 171 which are pivotally connected at their upper ends to one end of the respective links 172 and 173, the opposite ends of which links are connected to the connecting bars 174 and 175, as indicated at 176. The connecting bars 174 and 175 respectively comprise two members located in spaced parallel relation to each other as shown in Fig. 11. The bars 174 and 175 are made up of sections of suitable length the adjoining ends of which are connected by means of short links or bars 177, the connections being made by pins and slots as indicated at 178. By this form of connection the expansion and contraction due to whatever causes are provided for.

Rocking movements of the arms 170 and 171 cause reciprocatory movements of the connecting links 172 and 173 which movements are imparted to the connecting bars 174 and 175. The bars 174 and 175 are loosely pivotally connected to the lower ends of lever arms 180 and 181, the lower ends of the said arms extending between the members of which the bars 174 and 175 are formed and being connected thereto by pivot pins 182 and 183. The upper ends of the lever arms 180 are connected to the adjoining ends of the hot bed bars 80 while the upper ends of the lever arms 181 are connected to the adjoining ends of the hot bed bars 81. The outer ends of the pivots by which the adjoining end portions of the bars 80 are connected to the sills 83 project through openings 185 at the upper ends of the lever arms 180. The upper ends of the said lever arms have further connection with the adjoining ends of the said bars 80 by means of bolts 186 which extend therethrough and through projections 187, as is clearly indicated in Figs. 7, 11 and 11ª. The upper ends of the lever arms 181 are in like manner connected to the adjoining ends of the bars 81, as will be apparent from an inspection of Figs. 7 and 11 of the drawings.

For the purpose of positively limiting the pivotal movements of the hot bed bars 80 and 81 so as to insure that either the branches 155 or 156 of the respective hot bed bars 80 and 81 will occupy a vertical position as may be desired I have provided means for limiting the pivotal movements of the said bars. The said means comprises projections 188 (Figs. 2, 7, and 10) upon the connecting bars 174 and 175 which extend downwardly therefrom and which are located between relatively stationary spaced stops 189 consisting of short sections of angle iron which are arranged in couples, one couple being secured upon the bottom edge of a side sill 83 and another couple being located upon the bottom edge of a side sill 84.

The relatively stationary stops 189 project laterally and outwardly as indicated in Figs. 2 and 7 so that the co-operating projecting movable stop members 188 which are carried by the respective connecting bars 174 and 175 are located between the stops of the respective couples. When the movable projecting stop members 188 are in the position shown in Fig. 10 of the drawings it will be noted that the notched branches 156 of the hot bed bars 80 and 81 occupy vertical positions. Upon movement of the connecting bars 174 and 175 to carry the movable projecting stops from the position shown in Fig. 10 into position to contact with the opposite stops of the relatively stationary stops 189, movement of the lever arms 180 and 181 will be effected to cause pivotal or rotary movement of the hot bed bars 80 and 81 into positions to locate the smooth-edged branches 155 in vertical positions.

From the foregoing description it will be apparent that by causing the connecting rods 172 and 173 to move longitudinally corresponding movements are imparted to the connecting bars 174 and 175 as a result of which the hot bed bars 80 and 81 are rotated so as to adjust either one of the branches 155 or 156 thereof into vertical position as may be desired.

If it be desired to feed the work step by step along the bars and across the apparatus the adjustment as shown in Figs. 10, 11 and 11ª will be employed wherein the branches having the notches in the top edges thereof are shown in vertical operative position. When in that position the branches 155 with the smooth outer edges are located in inoperative or inactive positions. However, if it is desired to let the raw material roll across the hot bed or when cooling material of such section as would not fit into the notches the bars should be turned so as to adjust the branches 155 into vertical positioned place.

To those familiar with the art to which this invention relates the advantages of a construction of this character will be obvious.

Although in the embodiment of my invention as illustrated the smooth and notched bars 155 and 156 are of integral construction, being embodied in a single unit or bar, I desire to emphasize the fact that my invention comprehends any construction wherein means is provided for the utilization of bars having retarding edges as notches therein, or bars having unretarding, as smooth, outer edges along which the work may be caused to travel as may be elected.

In Fig. 17 of the drawings I have shown a construction in which the parts which are illustrated therein are substantially identical with the corresponding parts which are correspondingly numbered in the previous figures of the drawings. The substantial difference between the construction as illustrated in Fig. 17 and in the corresponding figure numbered 3 resides in the fact that in the former the bars 49 and the push bars 60 are omitted. Such omission permits also the omission of the means for operating the push bars 60 and also certain means associated with the transfer bars 49.

In the construction as illustrated in Fig. 17 the work when elevated by the plungers 48 is discharged onto a downwardly and inwardly extending flange 190 which projects laterally from the upper edge portion of the wall which forms the shoulder 47. A construction such as is illustrated in Fig. 17 may be employed when it is not desired to pack or pile the work before its delivery onto the hot bed bars 80 and 81.

In the claims directed to mechanism for delivering work to the hot bed bars of the hot bed the reference to hot bed bars in the introduction portion, used by way of description rather than limitation, is intended for any suitable receiving supporting means, hot bed bars or the like.

It will be seen that by my invention I have provided an apparatus comprising a number of parts combined into a unitary structure and cooperating to effect in a highly efficient manner the results desired.

Having thus described my invention, what I claim and desire to secure by Letters Patent is:

1. In a hot bed, the combination of an approach table, means for delivering work into co-operative relation to said table, means for yieldingly supporting said table, means for elevating said table to engage said work, and means actuated by the movement of the elevating means for discharging the work from the said table.

2. A hot bed comprising, in combination, work delivery means, an approach table, means for elevating the said table by a yielding pressure against the support therefor, means rendering the said yielding means effective to elevate the said table, and means acting simultaneously with the elevation of said table to discharge the work therefrom.

3. In the work delivery means of a hot bed, the combination of a delivery table, pivoted arms for supporting said table, yielding means tending to elevate said arms, means for pulling the said arms downwardly against the action of said yielding means, means for releasing the said pulling means to permit the said yielding means to cause upward movement of the said arms and of the table supported thereby, and means operating simultaneously for discharging the work from said table.

4. In the work delivery means of a hot bed, the combination of a work delivery table, pivoted means for supporting said table, yielding means for supporting the outer swinging portion of the pivoted means, the said yielding means tending to cause upward movement of the said pivoted supporting means, means operating to hold the said supporting means and the table supported thereby in depressed position, means for controlling the said means for holding the said supporting means in depressed position, and means controlled by the last mentioned means for contacting with and discharging the work from the said table.

5. In the work delivery means of a hot bed, the combination of a work delivery table, means for yieldingly supporting said table, means normally holding the said last mentioned means with the table supported thereby in depressed position, resilient means tending to hold the said table and its supporting means in elevated position, means for releasing the said table and its supporting means for permitting upward movement thereof by the action of the said yielding means, and members acting automatically to contact with the work and remove the same from the said table.

6. In the work delivery means of a hot bed, the combination of a work table, means for feeding work into position over the said table, movable means for supporting said table, resilient supporting means for engaging the said movable supporting means and yieldingly supporting the same and tending to cause upward movement thereof, means having adjustable connection with the said table supporting means for normally holding the same in depressed position, means for releasing the last named means to permit upward movement of the said table under the influence of the said resilient supporting means, and means automatically controlled by the said releasing means for contacting with the work and transferring the same from the said table.

7. In the work delivery means of a hot bed, the combination of a delivery table, means for delivering work into position over the said table, resilient means for yieldingly supporting said table, bell crank levers, links having connection at their lower ends with the horizontal arms of the said bell crank levers, the upper ends of the said links having operative connection with the said table, the said links operating when the said bell crank levers occupy one position to hold the said table in depressed position in opposition to the force exerted by the said resilient supporting means, means for effecting pivotal and bodily movements of the said bell crank levers to actuate said links to effect raising and lowering of the said table, and means having connection with the said bell crank levers and operated by the movements thereof to contact with and transfer the work from the said table.

8. In the work delivery means of a hot bed, the combination of a work delivery table, means for conveying work into position over the said table, resilient means for yieldingly supporting the said table, an eccentric shaft having eccentric portions at intervals therein, straps mounted upon the said eccentric portions, arms extending laterally and horizontally from the said straps, links having connection at their lower ends with the said arms and at their upper ends having operative connection with the said table and operating when in one position to hold the said table in depressed position, the said straps also having arms extending laterally in substantially right angular relation to the first named arms, pivoted links to the swinging ends of which the outer ends of the said last mentioned arms are pivotally connected whereby rotary movement of the said eccentric shaft causes both pivotal and bodily movements of the said straps and of the arms projecting therefrom whereby movements of the said links are effected to cause vertical up and down movements of the said table, and the said straps also being provided with upwardly extending arms having members projecting upwardly therefrom, the upper ends of which terminate in cooperative relation to the said table, the said members being moved upwardly and downwardly and also pivotally to effect transfer of the work from the said table when the latter is in elevated position.

9. In mechanism for delivering work to the hot bed bars of a hot bed, the combination of approach delivery means for the work, means for moving the work from said approach delivery means, supporting means located laterally of said delivery means for supporting the work removed from the delivery means, and means movable through variable distances for moving the work along the said supporting means.

10. In mechanism for delivering work to the hot bed bars of a hot bed, the combination of approach delivery means for the work, work supporting means located laterally of the approach delivery means, means for transferring the work from said approach delivery means to the said work supporting means, the said transfer means comprising plungers arranged in pairs, means for causing the plungers of the respective pairs to move simultaneously in opposite directions for transferring the work by steps to the said work supporting means, and means which is adapted to engage the work piece by piece and cause it to travel continuously from one side to the other of the said work supporting means.

11. In mechanism for delivering work to the hot bed bars of a hot bed, the combination of approach delivery means for the work, work supporting means located laterally of the said approach delivery means, means for transferring the said work from the said work delivery means to the said work supporting means, the said transfer means comprising a plurality of pairs of plungers, means for simultaneously actuating the plungers of the respective pairs in opposite directions to effect step by step movement of the work on to the said work supporting means, and variably moving means for causing the work to move inwardly over the said work supporting means toward the hot bed bars.

12. In mechanism for delivering work to the hot bed bars of a hot bed, the combination of approach delivery means for the work, work supporting means located laterally of the said delivery means, means for transferring the work from the said delivery means to the said work supporting means, and reciprocating push bars for engaging the work to cause it to move inwardly upon the work supporting means to deliver the same to the hot bed bars.

13. In mechanism for delivering work to the hot bed bars of a hot bed, the combination of approach delivery means for the work, stationary work supporting means located laterally of said approach delivery means, means for transferring the work from the delivery means to the stationary work supporting means, the said transfer means comprising a plurality of pairs of plungers, means for simultaneously actuating the plungers of all of the pairs alternately in opposite directions to transfer the work step by step to the said stationary work supporting means, and variably moving push bars adapted to engage the work piece by piece as it is delivered onto the said stationary work supporting means to cause the same to move forward upon the said stationary work supporting means from which it is delivered to the hot bed bars.

14. In mechanism for delivering work to the hot bed bars of a hot bed, the combination of approach delivery means for the work, stationary work supporting means located laterally of the said delivery means, means for transferring the work from the said delivery means to the said stationary work supporting means, abutments movably supported in cooperative relation to the said stationary work supporting means against which the work is piled, push bars which are adapted to engage the said work and cause step by step movement thereof upon the said stationary work supporting means, and means for causing reciprocatory movements of the said push bars.

15. In a hot bed, the combination of a couple of series of hot bed bars, means for delivering work onto the said bars at one side of the hot bed structure, a plurality of couples of sills extending longitudinally of the hot bed structure, one of which couples supports one series of the said bars and the other of said couples the other series thereof, means for connecting the sills of the respective couples together, upright pivoted members for supporting the said sills, the said members having pivotal connection with the said sills, the said upright supporting members at opposite sides of the hot bed being arranged in pairs, means for effecting movements simultaneously of the members of all of the pairs vertically in opposite directions, and means for simultaneously effecting lateral movement of the two couples of sills in opposite directions, and means for varying both the vertical and horizontal distances through which the said sills are moved.

16. In a hot bed, the combination of a couple of series of hot bed bars, separate pairs of sills for supporting the bars of the respective series, connections extending between the sills of the respective pairs and rigidly uniting the same, pivotally supported links having pivotal connection with the said sills for supporting the same, the links at opposite sides of the hot bed structure being arranged in pairs, rock shafts having arms extending in opposite directions upon which the said sill supports of the respective pairs are pivotally mounted, means for rocking said arms to cause alternate movement of the respective pairs of sills vertically in opposite directions, links extending in directions substantially parallel with the connections between the sills of the respective pairs, the said links being arranged in pairs, one of the links of each pair having operative connection at its outer end to one pair of sills and the other link of each pair having operative connection at its outer end to the other pair of said sills, and means for causing reciprocating movements of the said links, the links of the respective pairs moving simultaneously and alternately in opposite directions.

17. In a hot bed, the combination of a couple of series of hot bed bars, separate pairs of sills for supporting the bars of the respective series, connections extending between the sills of the respective pairs and rigidly uniting the same, pivotally supported links having pivotal connection with the said sills for supporting the same, the links at opposite sides of the hot bed structure being arranged in pairs, rock shafts having arms extending in opposite directions upon which the said sill supports of the respective pairs are pivotally mounted, means for rocking said arms to cause alternate movement of the respective pairs of sills vertically in opposite directions, links extending in directions substantially parallel with the connections between the sills of the respective pairs, the said links being arranged in pairs, one of the links of each pair having operative connection at its outer end to one pair of sills and the other link of each pair having operative connection at its outer end to the other pair of said sills, means for causing reciprocating movements of the said links, the links of the respective pairs moving simultaneously and alternately in opposite directions, and means for varying both the vertical and horizontal movements of the said sills.

18. In a hot bed, the combination of a couple of series of hot bed bars, a couple of pairs of sills for supporting the said bars, one series of bars being supported upon one pair of sills and the other series of bars being supported upon the other pair of sills, bars extending between and rigidly connecting the sills of the respective pairs, vertically extending links for supporting said sills, the said links being pivotally supported at their lower ends and having pivotal connection at their upper ends to the said sills, the links at opposite sides of the hot bed being arranged in pairs one link of each pair being connected to one of the sills of one pair of sills and the other link of each pair being connected to one of the sills of the other pairs of sills, rock shafts, arms projecting in opposite directions from the said shafts, upon which arms the lower ends of the links of the respective pairs are mounted, means for simultaneously rocking the shafts at the opposite sides of the hot bed to cause simultaneous vertical movements of the two pairs of sills in opposite directions, a plurality of vertical rock shafts located in a plane extending medially of the said hot bed, the said rock shafts being pivotally supported at their upper and lower ends, arms extending in opposite directions from the upper ends thereof, links pivotally connected at their inner ends to the said arms, the opposite outer ends of the said links being pivotally and operatively connected to the sills of the respective pairs of sills, and means for rocking the said shafts to cause simultaneous and alternative movements of the said pairs of sills in opposite directions.

19. In a hot bed, the combination of a couple of series of hot bed bars, a couple of pairs of sills for supporting the said bars, one series of bars being supported upon one pair of sills and the other series of bars being supported upon the other pair of sills, bars extending between and rigidly connecting the sills of the respective pairs, vertically extending links for supporting said sills, the said links being pivotally supported at their lower ends and having pivotal connection at their upper ends to the said sills, the links at opposite sides of the hot bed being arranged in pairs, one link of each pair being connected to one of the sills of one pair of sills and the other link of each pair being connected to one of the sills of the other pair of sills, rock shafts, arms projecting in opposite directions from the said shafts, upon which arms the lower ends of the links of the respective pairs are mounted, means for simultaneously rocking the shafts at the opposite sides of the hot bed to cause simultaneous vertical movements of the two pairs of sills in opposite directions, a plurality of vertical rock shafts located in a plane extending medially of the said hot bed, the said rock shafts being pivotally supported at their upper and lower ends, arms extending in opposite directions from the upper ends thereof, links pivotally connected at their inner ends to the said arms, the opposite outer ends of the said links being pivotally and operatively connected to the respective pairs of sills, means for rocking the said shafts to cause simultaneous and alternative movements of the said pairs of sills in opposite directions, and a single means common to all of said rock shafts for controlling and varying the extent of rocking movement thereof.

20. In a hot bed, the combination of a couple of series of bars for supporting the work while it is being cooled, a couple of pairs of sills for supporting the respective series of bars, means for rigidly connecting the sills of the respective pairs, a series of devices having operative connection with the respective pairs of sills, and means common to all of the said devices for effecting simultaneous operation thereof to cause simultaneous movements of the said pairs of sills alternately in opposite directions.

21. In a hot bed, the combination of a plurality of series of bars for supporting the work and conveying it across the hot bed while it is being cooled, means common to all of the bars of the plurality of series for effecting vertical movements thereof, the movements of the bars of the different series being effected simultaneously and in opposite directions, and means common to all of the bars of the plurality of series for effecting horizontal movements thereof, the movements of the different series taking place simultaneously in opposite directions.

22. In a hot bed, the combination of a plurality of series of bars for supporting the work and conveying it across the hot bed while it is being cooled, means common to all of the bars of the plurality of series for effecting vertical movements thereof, the movements of the bars of the different series being effected simultaneously and in opposite directions, means common to all of the bars of the plurality of series for effecting horizontal movements thereof, the movements of the different series taking place simultaneously in opposite directions, and separate means for varying the extent of vertical and horizontal movements of the bars of the respective series.

23. A hot bed comprising two series of hot bed bars, the work supporting edges of the bar of one series having retarding surfaces for retarding the work supported thereon and the work supporting edges of the bars of the other series having plane surfaces to permit free movement of the work thereover, and means for adjusting the said bars so that either the bars having work retarding edges or those having plane work supporting edges may be presented for receiving the work to be cooled.

24. A hot bed comprising hot bed bars extending transversely thereof, means for supporting said bars, and means for adjusting the said bars so that bars having notches in their work supporting edges or having plane work supporting edges may be presented for receiving the work to be cooled.

25. A hot bed comprising hot bed bars extending transversely thereof, the said bars being divided into a couple of series, and means for simultaneously adjusting the bars of both series to provide means for retarding the work in its travel upon the said bars or to permit free movement of the work upon said bars.

26. A hot bed comprising hot bed bars extending transversely thereof, the said bars being divided into a couple of series, means for pivotally supporting the said bars, each of the said bars comprising a couple of work supporting edges, one of which is adapted to retard the movement of the work thereupon and the other one of which is plane, whereby the movement of the work thereupon is facilitated, and means for adjusting the said bars so as to position either of said edges for receiving the work.

27. A hot bed comprising hot bed bars extending transversely thereof, the said bars being divided into a couple of series, means for pivotally supporting the said bars, each of the said bars comprising a couple of work supporting edges, one of which is adapted to retard the movement of the work thereupon and the other one of which is plane, whereby the movement of the work thereupon is facilitated, and means for simultaneously adjusting all of the said bars to position either of the edges of the respective bars to receive the work.

28. A hot bed comprising a plurality of hot bed bars extending transversely thereof, each of the said bars being of V-shape in cross section to provide two work supporting edges one of which has notches therein and the other of which is plane, means for pivotally supporting the said bars, and means for effecting pivotal movement of said bars to position either the notched edge or the plane edge to receive the work.

29. A hot bed comprising a plurality of hot bed bars extending transversely thereof, each of the said bars being of V-shape in cross section to provide two work supporting edges one of which has notches therein and the other of which is plane, means for pivotally supporting the said bars, and means for simultaneously causing pivotal movement of all of the said bars to position either the notched edges or the plane edges thereof to receive the work.

30. A hot bed comprising hot bed bars extending transversely thereof, the said bars being divided into a couple of series, each bar of each series comprising a couple of work supporting edges one of which is provided with notches and the other one of which is plane, and means for simultaneously adjusting all of the said bars of each series to position either of the edges thereof to receive the work.

31. A hot bed comprising hot bed bars extending transversely thereof, the said bars being divided into a plurality of series, means for pivotally supporting the bars of each series, each of the said bars comprising a couple of work supporting edges one of which edges is notched and the other one of which is plane, and means for simultaneously causing pivotal movement of all of the bars of all of the said series so as to simultaneously position either of the edges of the respective bars to receive the work.

32. A hot bed comprising hot bed bars extending transversely thereof, the said bars being divided into a couple of series, and means common to all of the said bars for effecting adjustments thereof simultaneously to position either plane or notched edge bars for receiving and supporting the work.

33. A hot bed comprising hot bed bars extending transversely thereof, the said bars being divided into a couple of series, means common to all of the said bars for effecting adjustments thereof simultaneously to position either plane or notched edge portions for receiving and supporting the work, and means for causing the work to travel transversely of the hot bed structure upon the said bars.

34. In a hot bed, the combination of a couple of series of hot bed bars, means for delivering work onto the said bars at one side of the hot bed structure, a plurality of couples of sills extending longitudinally of the hot bed structure, one of which couples supports one series of the said bars and the other of said couples the other series thereof, means for connecting the sills of the respective couples together, upright pivoted members for supporting the said sills, the said members having pivotal connection with the said sills, the said upright supporting members at opposite sides of the hot bed being arranged in pairs, means for effecting movements simultaneously of the members of all of the pairs vertically in opposite directions, and means for simultaneously effecting lateral movement of the two couples of sills in opposite directions.

35. In combination, means for feeding work, levers supported in co-operative relation to the work, eccentric means having pivotal connection with said levers intermediate their ends, means for causing rotation of said eccentric means, and means for causing swinging movement of said levers about the said eccentric means upon rotation of the latter.

36. In combination, means for feeding work, levers located in co-operative relation to said work and extending in directions transversely of the feeding movements thereof, a shaft having eccentric portions, means for pivotally connecting the said levers intermediate their ends to the said eccentric portions, links each of which is pivoted at one end to a stationary pivot, pivots for connecting the opposite swinging ends of said links to the ends of said levers distant from the said work, and means for rotating the said shaft to cause lengthwise and pivotal movements of the said levers whereby the said levers operate to discharge the work from the feeding means.

In testimony that I claim the foregoing as my invention I have hereunto signed my name this 27th day of August, A. D. 1929.

EDWARD T. PETERSON.